(12) United States Patent
Inose et al.

(10) Patent No.: US 7,339,694 B2
(45) Date of Patent: Mar. 4, 2008

(54) CHIT PRINTING SYSTEM, CHIT PRINTING APPARATUS AND CHIT PRINTING METHOD

(75) Inventors: Koji Inose, Saitama (JP); Tsunehiro Tsukada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 887 days.

(21) Appl. No.: 10/691,509

(22) Filed: Oct. 24, 2003

(65) Prior Publication Data

US 2004/0088655 A1    May 6, 2004

(30) Foreign Application Priority Data

Oct. 30, 2002   (JP)   .............................. 2002-316308

(51) Int. Cl.
G06F 3/12      (2006.01)
G06F 15/00     (2006.01)
G06K 1/00      (2006.01)

(52) U.S. Cl. ...................... 358/1.15; 358/1.1; 358/1.16; 347/14; 347/15; 347/19; 703/201; 703/202; 703/203

(58) Field of Classification Search ................ 358/1.1, 358/1.15, 1.16; 347/14, 15, 19; 703/201, 703/202, 203
See application file for complete search history.

(56) References Cited

FOREIGN PATENT DOCUMENTS

| JP | 5053954 | 3/1993 |
|---|---|---|
| JP | 2000-284937 | 10/2000 |
| JP | 2000284937 | 10/2000 |

OTHER PUBLICATIONS

English translation of JP Office Action dated Jul. 10, 2007.

*Primary Examiner*—Twyler Lamb
*Assistant Examiner*—Yixing Qin
(74) *Attorney, Agent, or Firm*—Fitzpatrick, Cella, Harper & Scinto

(57) ABSTRACT

A request is transferred from a first information processing apparatus to a second one, and document data for printing is generated in accordance with the print request by a generating program provided in an image generating apparatus, and then the generated document data is transferred from the second information processing apparatus to the first one so that the document data is printed out. A type of input data or a type of output data processable by the generating program provided in the image generating apparatus is registered in the second information processing apparatus. A type of input data necessary to generate the document data and a type of the document data generated is specified in accordance with the print request. A generating program for generating the document data is selected by comparing the specified type to the registered type. A generating request for generating the document data is transferred to the image generating apparatus having the selected generating program.

14 Claims, 7 Drawing Sheets

FIG. 2

| IMAGE GENERATING APPARATUS ADDRESS | NUMBER | INPUT | OUTPUT | NAME | THE NUMBER OF PROCESSINGS | ALLOWABLE NUMBER OF PROCESSINGS |
|---|---|---|---|---|---|---|
| 172.aaa.bbb.ccc | (1) | Ia | Oa | Pa | 1 | 2 |
| | (2) | Ib | Ob | Pb | 0 | 2 |
| 172.aaa.bbb.ddd | (3) | Ia | Oa | Pa | 0 | 2 |

201 202 203 204 205 206 207

CHIT PRINTING SYSTEM, CHIT PRINTING APPARATUS AND CHIT PRINTING METHOD

BACKGROUND OF THE INVENTION

1. Field of the Invention

The present invention relates to a printing system for printing a chit and the like as a printed matter, a printing method employed therein, an information processing apparatus and a control program.

2. Related Background Art

With the rapidly advancing Internet and Web servers (WWW servers) established in large numbers, business transactions are being actively performed on the Web. A host computer used by users, which has a web browser allowing users to both view and input information, enables them to perform business transactions through the web browser.

Such business transactions performed through the web browser requires a web server existing on a network, whereby the web browser and the web server communicate information therebetween over the network. For example, the web server receives information input by a user from the web browser, processes the information, and then returns the processed information to the web browser, while the web browser displays information received from the web server and allows a user to input new information.

In printing processing associated with business transactions, the web server generates print data in accordance with a print instruction from the web browser, and then transmits thereto the generated print data. The web browser directly transfers the print data coming from the web server to a printer, therefore the web browser is free from complicated processing (e.g., Japanese Patent Application Laid-Open No. 2000-284937).

SUMMARY OF THE INVENTION

In a conventional printing system, an image generating unit for generating print data is only engaged in the generation of data in a fixed output format from data in a fixed input format. Furthermore in such a printing system, even when there exists a plurality of image generating units, any of these is selectable in generating the print data.

However, to cope with data in new input or output formats, it is desirable that an image generating program for generating print data is additionally installable to a system and that the print data is generated by the image generating program.

It is, therefore, a feature of the present invention to provide a system adaptable to data in new input or output formats by designing the above-described system that allows addition or modification of an image generation program so that an appropriate image generating program can be selected.

To address the foregoing problem, a printing method in one embodiment is a printing method in which a print request is transferred from a first information processing apparatus to a second information processing apparatus, and document data for printing is generated in accordance with the print request by a generating program provided in an image generating apparatus, and then the generated document data is transferred from the second information processing apparatus to the first information processing apparatus so that the document data is printed out, wherein the method is characterized by comprising: a registering step of registering a type of input data or a type of output data processable by the generating program provided in the image generating apparatus with the second information processing apparatus; a specifying step of specifying a type of input data necessary to generate the document data and a type which the document data is generated in, in accordance with the print request; a selecting step of selecting a generating program for generating the document data by comparing the specified type to the registered type; and a transferring step of transferring a generating request for generating the document data to the image generating apparatus having the selected generating program.

Other features and advantageous of the present invention will be apparent from the following description taken in conjunction with the accompanying drawings, in which like reference characters designate the same or similar parts throughout thereof.

BRIEF DESCRIPTION OF THE DRAWINGS

FIG. 2 is one example of information stored in an image generating program data storage part;

DESCRIPTION OF THE PREFERRED EMBODIMENTS

Figure 1:
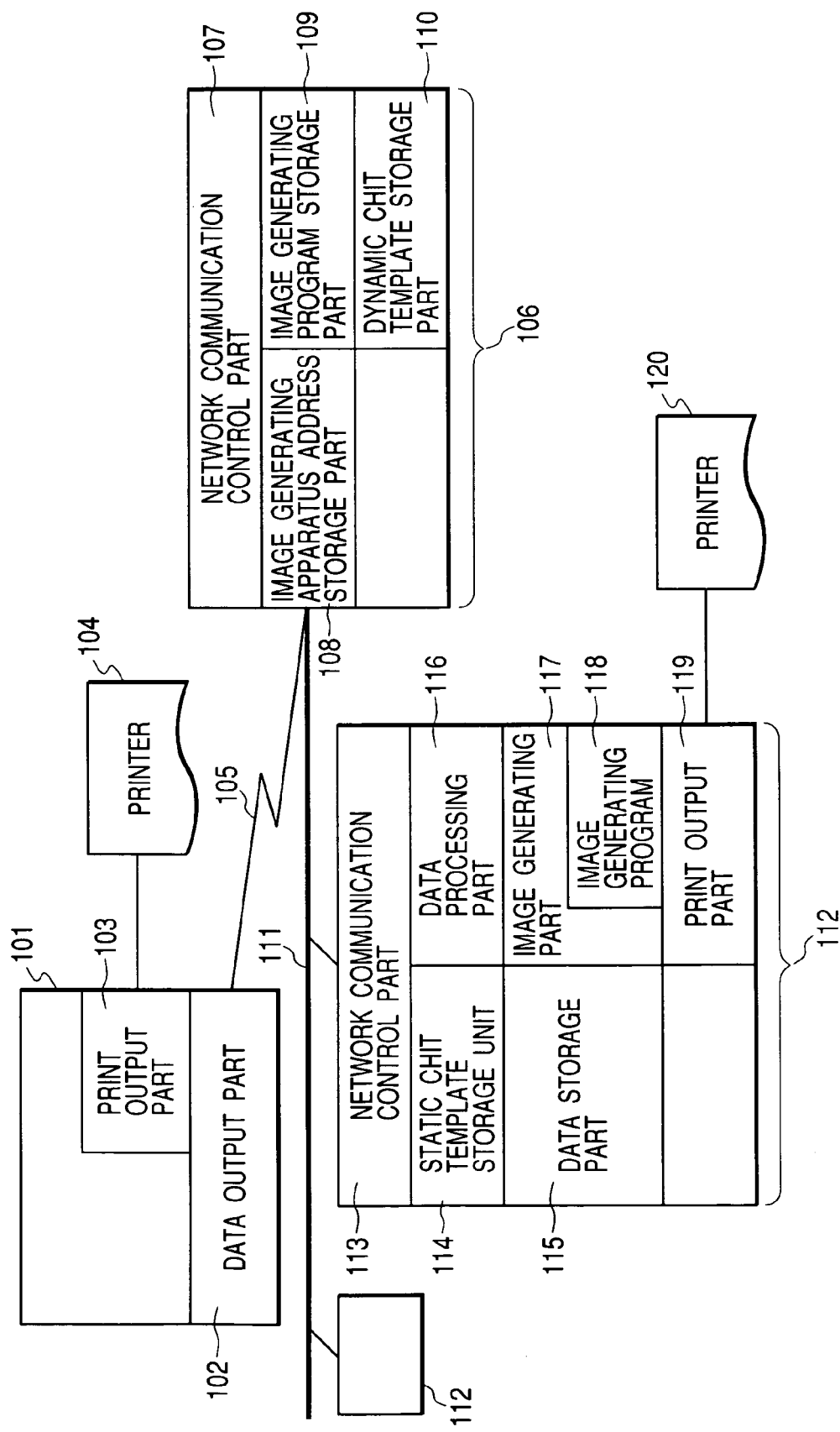
FIG. 1 is a diagram showing a system configuration.

FIG. 1 is a diagram showing a system configuration. Reference numeral 101 denotes a client computer that serves as an information processing apparatus, such as a work station, personal computer (PC) or mobile information terminal. Reference numeral 102 denotes a web browser operable as a data input/output part for inputting/outputting data to/from a web server. Reference numeral 103 denotes a print output part that converts data of images displayed on the web browser or data from other application programs into print data processable by a printer 104. The print output part 103 is typified by printer driver software. Reference numeral 104 denotes a printer.

Reference numeral 105 denotes a communication medium linking the server computer and the client computer together, which can be any of the following types: LAN, WAN, the Internet, cable network and wireless network.

Reference numeral 106 denotes a server computer that serves as an information processing apparatus, such as a work station or personal computer (PC). The server computer 106 is operable to distribute processing in accordance with designated inputs and outputs. Reference numeral 107 denotes a network communication control part functional as a web server, and 108 denotes an image generating apparatus address storage part for storing addresses of a plurality of image generating apparatus which can be candidates to be requested for processing. Reference numeral 109 denotes an image generating program storage part for storing information on image generating program(s) that each image generating apparatus holds. Reference numeral 110 is a dynamic chit template storage part for storing chit template data (chit form data) necessary to generate chit data.

Reference numeral 111 is a communication medium linking the image generating apparatus and the server computer, which can be any of the following types: LAN, WAN, the Internet, cable network and wireless network. The communication medium 111 and the communication medium 105 are illustrated independently from each other in FIG. 1, however, it is alternatively possible that the both are on the same communication medium.

Reference numeral 112 denotes an image generating apparatus, and 113 denotes a network communication control part for communicating with the web server. Reference numeral 114 denotes a static chit template storage part for storing chit template data necessary to generate chit data, and 115 denotes a data storage part such as a database, which stores various data of business transactions to be synthesized with the chit template data so that chit data may be generated. This chit data is chit representing data, for example, data for printing a chit which is structured so that the chit can be printed neatly. The chit data itself, however, does not need to be tailored to the printer, and may be, for example, data in a bitmap format or data described in a page description language.

Reference numeral 116 denotes a data processing part that runs on the basis of application logic complying with each business transaction, and 117 denotes an image generating part for generating chit data indicating a chit image in a designated format. Reference numeral 118 is an image generating program that can be dynamically added to the image generating part 117. The image generating part 117 operates in accordance with the image generating program. Reference numeral 119 denotes a print output part for converting the chit data generated in the image generating part to data processable by a printer 120. The print output part 119 is generally referred to as printer driver software. Reference numeral 120 is a printer. Note here that the image generating apparatus may be plural, each of which communicates with the server computer 106.

Figure 7:
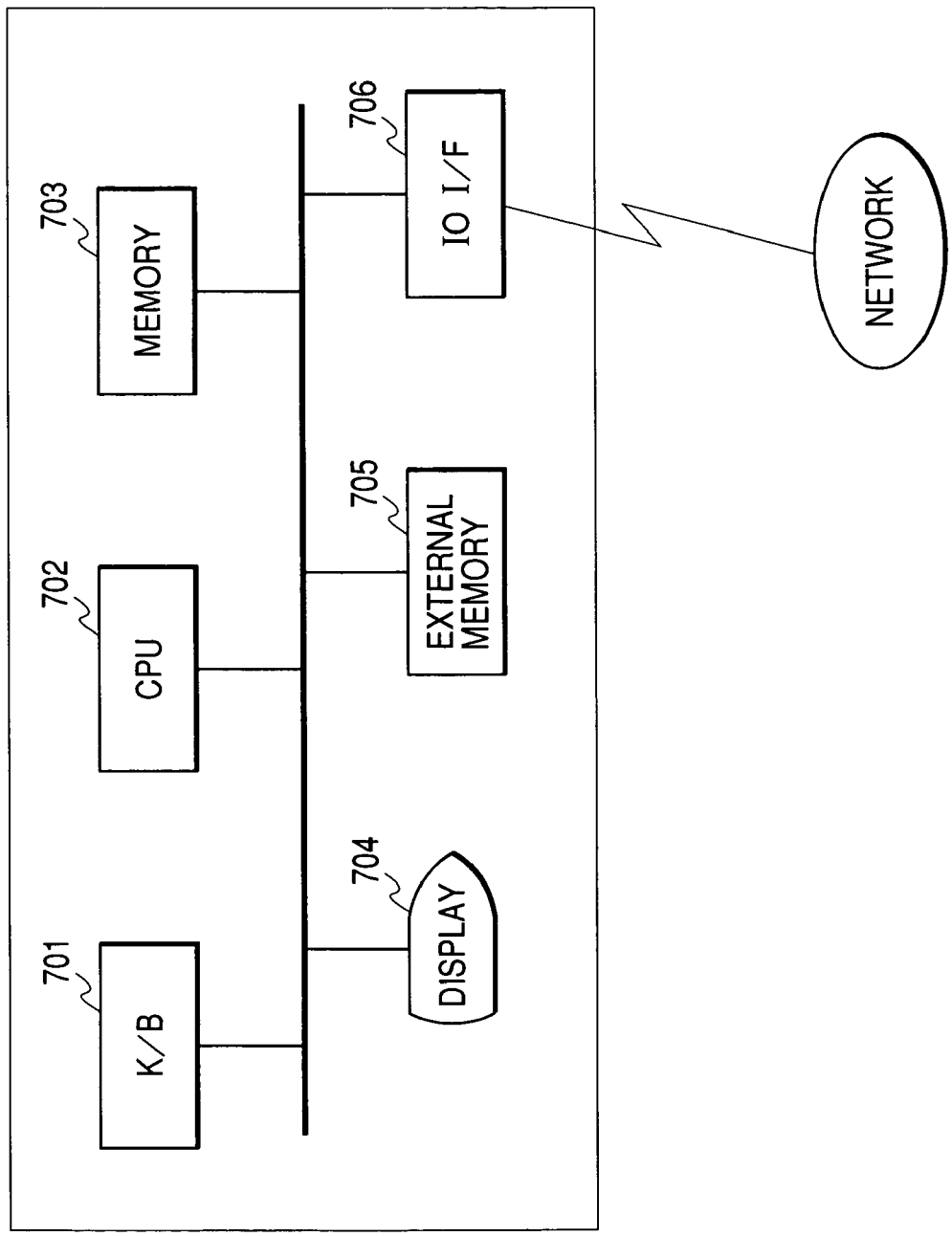
FIG. 7 is a diagram showing a control configuration of each client computer 101, server computer 106 and image generating apparatus.

FIG. 7 is a diagram showing a control configuration of each client computer 101, server computer 106 and image generating apparatus. Each component in FIG. 1 is realized when their corresponding programs are loaded into a memory 703 and then executed by a CPU 702 of a computer.

Theses programs are stored in an external memory 705 such as a hard disk. The external memory 705 may alternatively be a removable medium, such as a floppy disk and a CD-ROM.

On a display 704 a web browser and images are displayed. An I/O interface 706 is a port for establishing connection with the communication medium 105 or 111, and is typified by a network interface card or the like. A keyboard or pointing device 701 is used by user to input or designate information.

Figure 3:
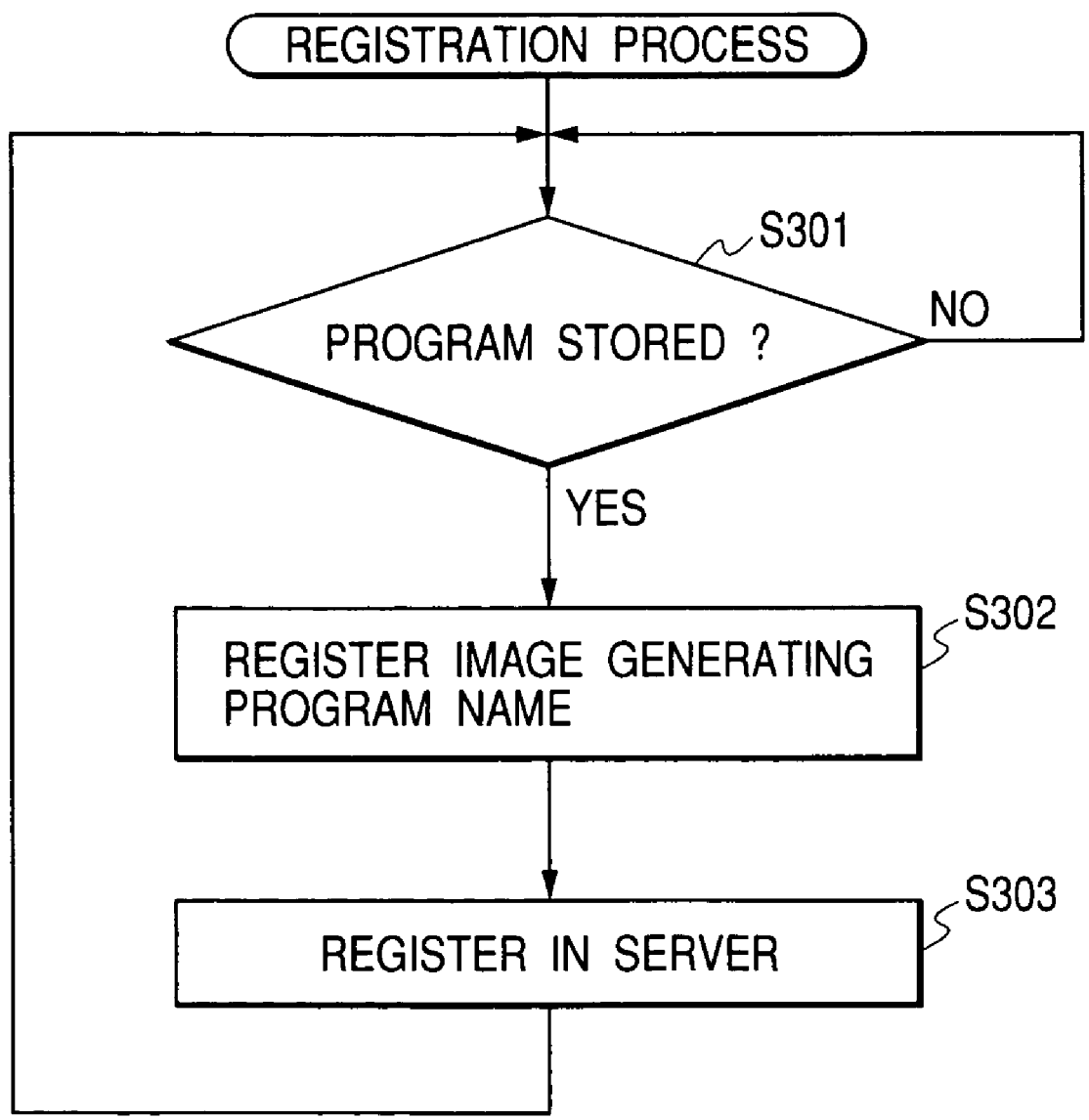
FIG. 3 is a flowchart of a process for registering an image generating program with a server computer.

Next paragraph will explain how the image generating apparatus makes its own image generating program utilizable in a system. FIG. 2 is one example of information stored in the image generating program data storage part, and FIG. 3 is a flowchart of a process for registering the image generating program with the server computer. This process is accomplished when the CPU executes a control program based on this flowchart.

As shown in FIG. 2, each row has data of one image generating program, and a column 201 has addresses of image generating apparatus storing their image generating programs. The data stored in the column 201 is stored also in the image generating apparatus address storage part. A column 202 has serial numbers of the image generating programs. A column 203 has an input type (input format) processable by the image generating program, and a column 204 has an output type (output format) which the image generating program can output in. A column 205 has a name of the image generating program, and a column 206 has the number of processings the image generating program is currently performing. A column 207 has the allowable number of processings of the image generating program.

FIG. 2 shows that the image generating apparatus of address "172.aaa.bbb.ccc" has two image generating programs, which means that different input types can be processed and different output types can be output, by these two image generating programs.

Referring to FIG. 3, the image generating apparatus determines whether the image generating program is stored (step S301). When determining that the program is stored, the image generating apparatus registers the program's name (step S302), and then transfers data corresponding to the columns 201 to 205 in the image generating program to the server computer so that it may register the data (step S303). The server computer stores thus received data in the table shown in FIG. 2. Now FIG. 3 deals with a case where steps S302 and S303 are executed for the image generating program when it is stored, however, these steps S302 and S303 may executed when the system is activated or at predetermined time during operation thereof, for the image generating program being stored at that time.

Figure 4:
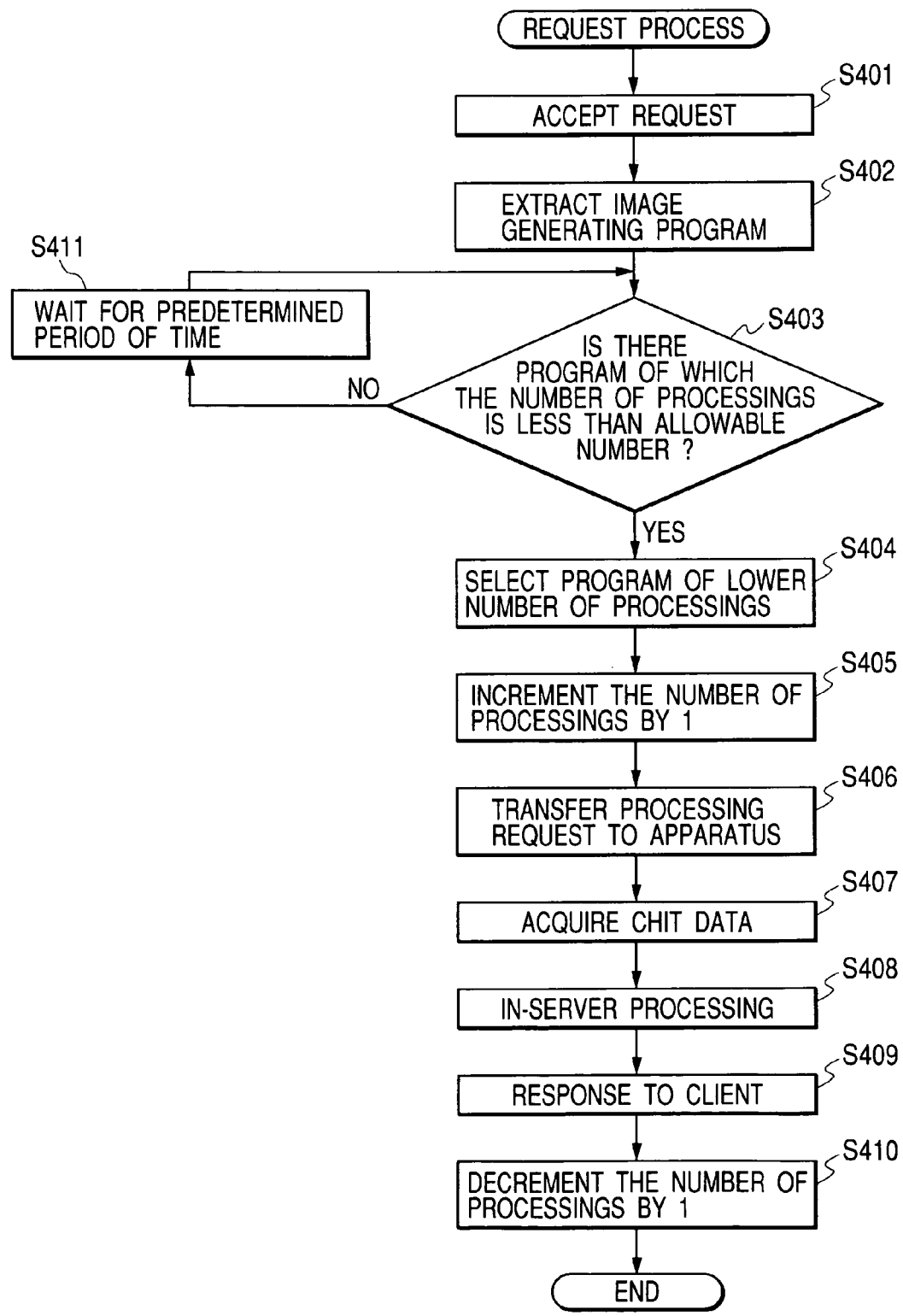
FIG. 4 is a flowchart of a request process in which a server computer 106 selects an image generating apparatus to transmit thereto a processing request.

FIG. 4 is a flowchart of a request process in which the server computer 106 selects an image generating apparatus to present thereto a processing request. The server computer 106 selects the image generating apparatus on the basis of the data in FIG. 2 and prompts the selected image generating apparatus to generate chit data. This process is accomplished when the CPU executes a control program based on this flowchart.

The server computer 106 executes processes in FIG. 4 when receiving a generating request for generating the chit data from the client computer 101. First the server computer 106 accepts the request (step S401) then specifies an input type and output type by extracting data indicating the input type and output type among the request data. By comparing the specified types to the table in FIG. 2, the server computer 106 extracts an image generating program having the types coincident with the requested ones (step S402). For example in FIG. 2, when the input type and output type designated in the request are "Ia" and "Oa", respectively, the image generating programs "(1)" and "(3)" are extracted accordingly.

The server computer 106 determines whether the number of processings now being performed is lower than the allowable number of processings, as for the extracted image generating programs (step S403). If there is no relevant program, the server computer 106 waits for a predetermined period of time (step S411) and then repeats this determining process (step S403).

If there are image generating programs of which the number of processings is lower than the allowable number, the server computer 106 selects an image generating program of the lowest number of processings (step S404). In the example of FIG. 2, the image generating program "(3)" is selected.

Next, the server computer 106 increments the number of processings being performed by the selected image generating program by 1 (step S405). Then, by referring to an address of the image generating apparatus having the selected image generating program, the server computer 106 transfers a processing request to this image generating apparatus (step S406). Upon receipt of chit data generated by the image generating apparatus (step S407), the server computer 106 transmits the generated chit data to the client computer (step S409) after performing necessary processing (step S408) in the server. The server computer 106 decrements the number of processings being performed by the selected image generating program by 1 in the end (step S410).

Through the above processes, image generating programs corresponding to the designated input type or output type are extracted among a plurality of image generating programs, and an image generating program of lower number of processings is further selected. An address of an image generating apparatus having the selected image generating program is accordingly specified and a processing request is transmitted to the specified address consequently.

Figure 5:
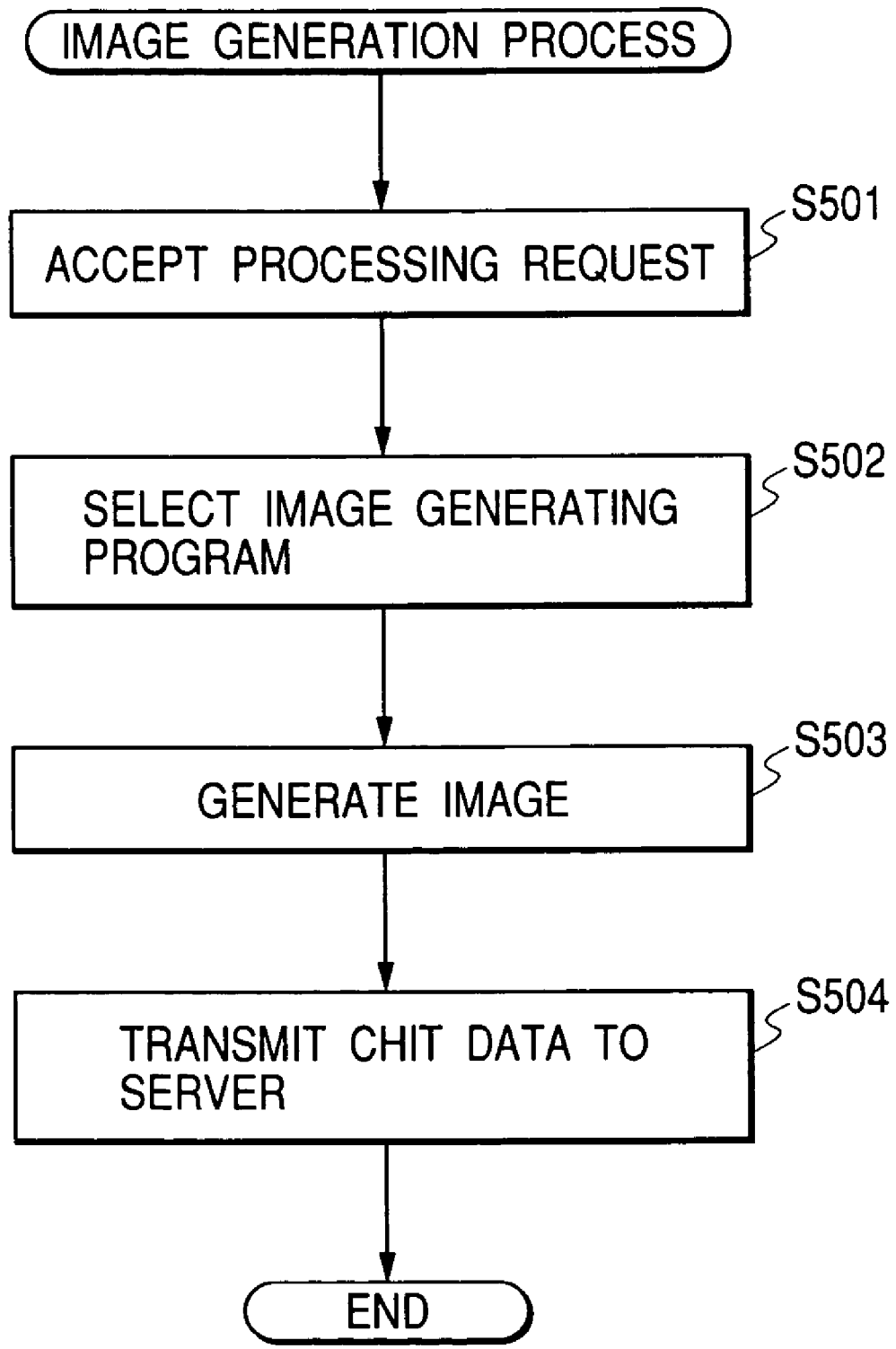
FIG. 5 is a flowchart of an image generation process executed by an image generating apparatus 112.

FIG. 5 is a flowchart of an image generation process executed by the image generating apparatus 112. Upon receipt of the processing request from the server computer 106, the image generation apparatus 112 executes this image generation process. This process is accomplished when the CPU executes a control program based on this flowchart.

First the image generating apparatus accepts the processing request for generating images from the server computer 106 (step S501). This processing request includes the designation of an input type or an output type. Therefore, the image generating apparatus extracts data of the input type or output type to select an image generating program appropriate to the designated input type or output type (step S502). Note here that the image generating apparatus is provided with the same table as in FIG. 2 for its own image generating programs, so that the image generating program is selected in accordance with data indicated in the table.

Figure 6:
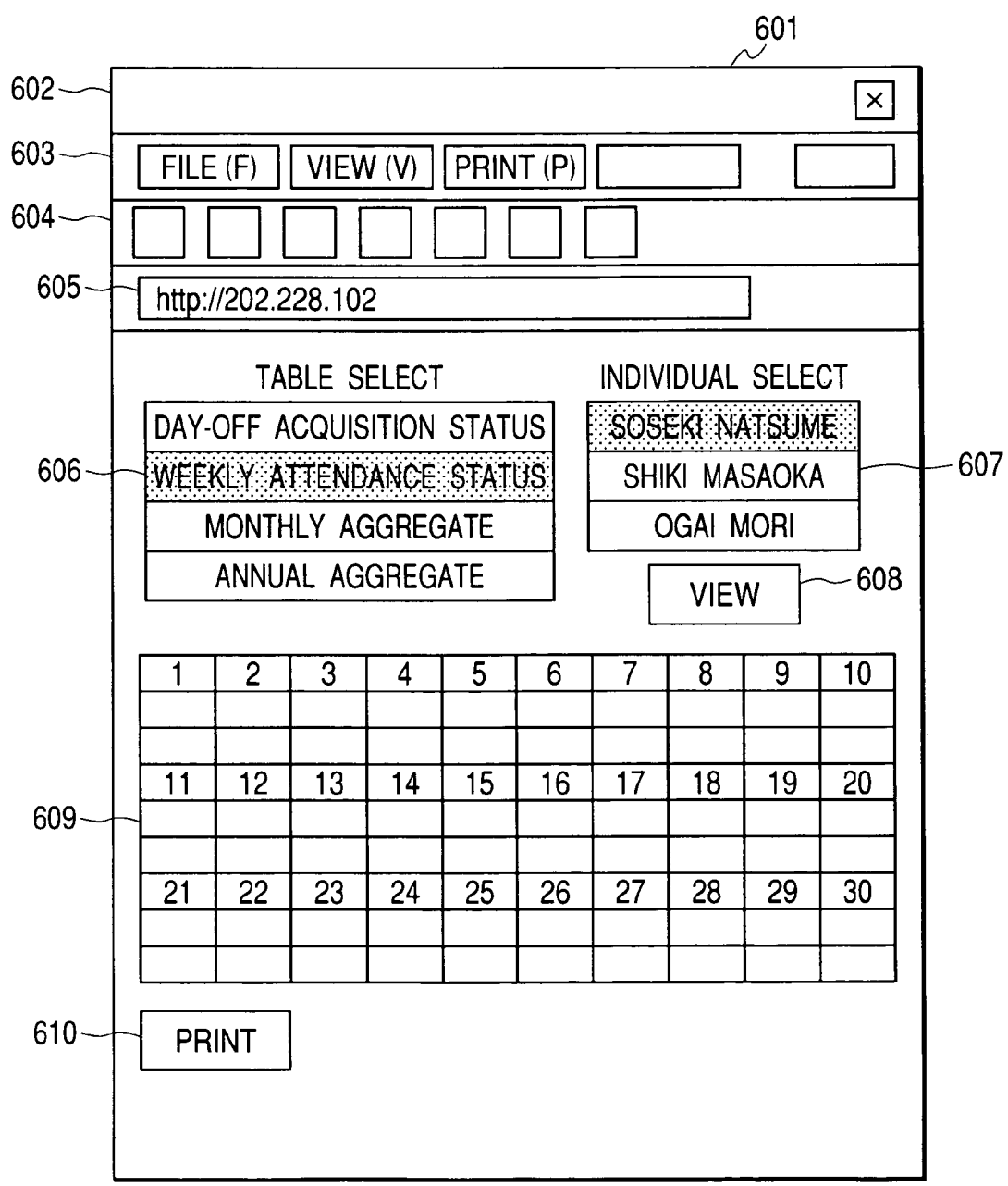
FIG. 6 is a diagram showing a screen displayed on a web browser of a client computer 101.

Next, the image generating apparatus generates chit data by executing the selected image generating program (step S503). The chit data is generated, for example, by synthesizing template data stored in the static chit template storage part 114 with data stored in the data storage part 115. Or, when template data (which is stored in the dynamic chit template storage part 110) is received with the processing request, such template data and the data stored in the data storage part 115 are synthesized together to generated the chit data. Or again, data input on the web browser of the client computer 101 is received via the server computer 106, and the received data and template data are synthesized together for generation of the chit data. FIG. 6 is a diagram showing a screen displayed on the web browser of the client computer 101. There is a possible case that the chit data is generated as a result of synthesis of data input on the screen in FIG. 6 and template data.

FIG. 6 is a diagram showing a page for business transactions displayed on the web browser. A user performs transactions using this page, and presses a print button 610 when he/she wants to obtain a printed matter for this page.

Reference numeral 601 denotes a window of the web browser displayed on a monitor or a display device of the client computer. Displayed in an area 602 is a window title. In areas 603 and 604, commands of the web browser are displayed. A user can print an image itself displayed on the window by utilizing printing functions provided to the web browser, in which case, however, a printed image may not contain necessary data or may be outputted unorganizedly.

Reference numeral 605 denotes a text field in which an address (URL: Uniform Resource Location) of the server computer to be accessed is to be input.

Reference numerals 606 and 607 are fields where each item is selectable by a user, and 608 denotes a view button. When this view button is pressed down, an item selected by user in each field 606 and 607 is transmitted to the server computer. In response to this, the server computer creates new display data (HTML document data for displaying) on the basis of a chit name selected in 606 and a name of person selected in 607, and then transmits the created display data to the client computer. The web browser display contents of the chit in accordance with the new display data representing the chit.

For example, when the view button 608 is pressed down, the web browser transmits a display instruction to the server computer, whereupon data of attendance status of Mr. Soseki Natsume is obtained from a database and display data is created based on the obtained data, then such display data is transmitted to the client computer. Finally, a weekly attendance status of Mr. Soseki Natsume is displayed in 609.

Also, when the print button 610 is pressed down, the web browser transmits a print instruction to the server computer, whereupon data of attendance status of Mr. Soseki Natsume is obtained from a database (e.g., data storage part 115) and template data corresponding to the chit selected in 606 is also obtained. Finally, these data are synthesized and chit data is thus created.

In the end, the created chit data is transmitted to the server computer 106 (step S504).

Through the above processes, the image generating apparatus can select the image generating program appropriate to the designated input type or output type to thereby generate the chit data.

It is understood here that that input type mainly indicates a type of input data, and includes, for example, a type of template data or data file which is used to generate the chit data. Therefore, the input type is not necessarily be designated definitely by a user, and the input type can be distinguished from an extension of the designated template data or data file (files including data stored in the data storage part 115).

Also, the output type mainly indicates a type of output data, and represents, for example, data format of the chit data. By the designation of the output type, the chit data in the bitmap format or the chit data described in the page description language is created according to such designation.

The template data may be statically stored in each image generating apparatus or may dynamically changes according to each request. The server computer 106 extracts template data processable by the selected image generating program among those stored in the dynamic chit template storage part 110 and then transmits the extracted one to the image generating apparatus. The template data is extracted based on an extension of a file including the template data, or the like.

The object of the present invention is achieved, when a storage media having recorded therein program codes of software for implementing the functions in the foregoing embodiment (e.g., the control program for controlling each component in FIG. 1, or the control programs for controlling processes in FIGS. 3 to 5) is supplied to a computer and then the computer (e.g., the CPU) reads and executes the program codes stored in the storage medium. A method commonly employed to supply a program or data to a computer is that a floppy (R) disk having stored therein the program or data is loaded onto the main unit of the computer (through a floppy(R) disk drive). This means that the above described functions in the foregoing embodiment are implemented by the program codes themselves read out from this storage medium and that this storage medium storing those program codes thus constitutes the present invention.

A storage medium for supplying the program codes includes, for example, a floppy disk or hard disk, as well as an optical disk, magneto-optic disk, CD-ROM, CD-R, magnetic tape, non-volatile memory card or ROM. Furthermore, it is needless to say that the functions in the foregoing embodiment are implemented not only by a computer executing the read out program codes, but also by part or all of the actual processing executed by an OS (operating system) and the like running on the computer. Moreover, the program codes read out from the storage medium are written into a memory provided to a function extension board inserted into the computer or a function extension unit connected to the computer and thereafter the CPU mounted on such function extension board or function extension unit executes part or all of the actual processing in accordance with instructions of the program codes, and consequently the functions in the foregoing embodiment are implemented by the part or all of the actual processing, which is also a matter of course.

As described above, the present invention can provide a printing system capable of coping with data in new input formats or new output formats. Particularly, addition and modification of an image generating program is allowed so that an appropriate image generating program can be selected, and thereby data in any new input or output format can be handled.

And more particularly, an image generating program appropriate to a designated input type or output type can be selected, therefore allowing a proper image generating apparatus to generate document data for printing.

What is claimed is:

1. A printing method in which a print request is transferred from a first information processing apparatus to a second information processing apparatus, and document data for printing is generated in accordance with the print request by a generating program provided in an image generating apparatus, and then the generated document data is transferred from the second information processing apparatus to the first information processing apparatus so that the document data is printed out, the method comprising:
    a registering step of registering a type of input data or a type of output data processable by the generating program provided in the image generating apparatus in the second information processing apparatus;
    a specifying step of specifying a type of input data necessary to generate the document data and a type which the document data is generated in, in accordance with the print request;
    a selecting step of selecting a generating program for generating the document data by comparing the specified type to the registered type; and
    a transferring step of transferring a generating request for generating the document data to the image generating apparatus having the selected generating program.

2. The printing method according to claim 1, wherein the registering step includes registering an address of the image generating apparatus having the generating program in the second information processing apparatus, and the transferring step includes specifying an address of the image generating apparatus having the selected generating program and transferring the generating request to the specified address.

3. The printing method according to claim 1, wherein the selecting step includes extracting a plurality of generating programs corresponding to the specified type and selecting the generating program of lower number of processings among the extracted generating programs.

4. The printing method according to claim 1, further comprising:
    a generating step of, by the generating program, generating the document data in accordance with the generating request; and
    a data transferring step of transferring the generated document data from the image generating apparatus to the first information processing apparatus via the second information processing apparatus.

5. The printing method according to claim 1, wherein the generating program generates the document data representing a chit by synthesizing template data and data described in the chit, and the specifying step includes specifying a type of the template data or the data described in the chit.

6. The printing method according to claim 1, wherein, in response to a pressing operation of a print button in a screen displayed on a web browser, the print request is transferred from the web browser to the second information processing apparatus, and the generated document data is transferred from the second information processing apparatus to the web browser.

7. A printing system in which a print request is transferred from a first information processing apparatus to a second information processing apparatus, and document data for printing is generated in accordance with the print request by a generating program provided in an image generating apparatus, and then the generated document data is transferred from the second information processing apparatus to the first information processing apparatus so that the document data is printed out, the system comprising:
    registration means for registering a type of input data or a type of output data processable by the generating program provided in the image generating apparatus in the second information processing apparatus;
    specifying means for specifying a type of input data necessary to generate the document data and a type which the document data is generated in, in accordance with the print request;
    selection means for selecting a generating program for generating the document data by comparing the specified type to the registered type; and
    transfer means for transferring a generating request for generating the document data to the image generating apparatus having the selected generating program.

8. The printing system according to claim 7, wherein the registration means registers an address of the image generating apparatus having the generating program in the second information processing apparatus, and the transfer means specifies an address of the image generating apparatus having the selected generating program and transfers the generating request to the specified address.

9. The printing system according to claim 7, wherein the selection means extracts a plurality of generating programs corresponding to the specified type and selects the generating program of lower number of processings among the extracted generating programs.

10. The printing system according to claim 7, further comprising:
    generation means for, by the generating program, generating the document data in accordance with the generating request; and
    data transfer means for transferring the generated document data from the image generating apparatus to the first information processing apparatus via the second information processing apparatus.

11. The printing system according to claim 7, wherein the generating program generates the document data representing a chit by synthesizing template data and data described in the chit, and the specifying means specifies a type of the template data or the data described in the chit.

12. The printing system according to claim 7, wherein, in response to a pressing operation of a print button in a screen displayed on a web browser, the print request is transferred from the web browser to the second information processing apparatus, and the generated document data is transferred from the second information processing apparatus to the web browser.

13. An information processing apparatus prompting a generating program provided in an image generating apparatus to generate document data for printing in accordance with a print request from an external information processing apparatus and thereafter transferring the generated document data to the external information processing apparatus, comprising:

registration means for registering a type of input data or a type of output data processable by the generating program provided in the image generating apparatus;

specifying means for specifying a type of input data necessary to generate the document data and a type which the document data is generated in, in accordance with the print request;

selection means for selecting a generating program for generating the document data by comparing the specified type to the registered type; and transfer means for transferring a generating request for generating the document data to the image generating apparatus having the selected generating program.

14. A control program to be stored in a storage medium for controlling an information processing apparatus prompting a generating program provided in an image generating apparatus to generate document data for printing in accordance with a print request from an external information processing apparatus and thereafter transferring the generated document data to the external information processing apparatus, wherein the program makes a computer execute the steps of:

registering a type of input data or a type of output data processable by the generating program provided in the image generating apparatus;

specifying a type of input data necessary to generate the document data and a type which the document data is generated in, in accordance with the print request;

selecting a generating program for generating the document data by comparing the specified type to the registered type; and transferring a generating request for generating the document data to the image generating apparatus having the selected generating program.

* * * * *

UNITED STATES PATENT AND TRADEMARK OFFICE
CERTIFICATE OF CORRECTION

PATENT NO. : 7,339,694 B2 Page 1 of 1
APPLICATION NO. : 10/691509
DATED : March 4, 2008
INVENTOR(S) : Inose et al.

It is certified that error appears in the above-identified patent and that said Letters Patent is hereby corrected as shown below:

ON THE TITLE PAGE, ITEM -56-:
    FOREIGN PATENT DOCUMENTS, "5053954" should read -- 5-053954 --; and
    "JP 2000284937 10/2000" should be deleted.

COLUMN 1:
    Line 46, "is" should read -- be --; and
    Line 47, "is" should read -- be --.

COLUMN 4:
    Line 26, "executed" should read -- be executed --.

COLUMN 5:
    Line 43, "generated" should read -- generate --.

COLUMN 6:
    Line 35, "be" should be deleted;
    Line 47, "changes" should read -- change --; and
    Line 66, "above described" should read -- above-described --.

Signed and Sealed this

Nineteenth Day of August, 2008

JON W. DUDAS
*Director of the United States Patent and Trademark Office*